US006830645B2

(12) United States Patent
Wells et al.

(10) Patent No.: US 6,830,645 B2
(45) Date of Patent: Dec. 14, 2004

(54) SYSTEM AND METHOD FOR RUPTURING ENCAPSULATED ADHESIVE IN SHEET MEDIA

(75) Inventors: Jeffrey Leigh Wells, Appleton, WI (US); Steven Michael Wilhelms, Appleton, WI (US); Todd Arlin Schwantes, Lena, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 09/816,321

(22) Filed: Mar. 26, 2001

(65) Prior Publication Data

US 2002/0134499 A1 Sep. 26, 2002

(51) Int. Cl.[7] ........................ B32B 31/00; B55C 9/20

(52) U.S. Cl. ....................... 156/277; 156/387; 156/510; 156/DIG. 34

(58) Field of Search ................................ 156/277, 256, 156/312, 155, 387, 510, 580, DIG. 1, DIG. 24, DIG. 49; 427/212, 207.1, 356, 358, 365, 369

(56) References Cited

U.S. PATENT DOCUMENTS

| | | | |
|---|---|---|---|
| 2,907,682 A | | 10/1959 | Eichel |
| 3,489,271 A | | 1/1970 | Tissot |
| 3,663,269 A | | 5/1972 | Fischer et al. |
| 3,666,597 A | | 5/1972 | Parnell |
| 3,725,501 A | | 4/1973 | Hilbelink et al. |
| 3,728,210 A | * | 4/1973 | Piron |
| 3,924,728 A | | 12/1975 | Brown et al. |
| 3,996,308 A | | 12/1976 | Douek et al. |
| 4,080,238 A | | 3/1978 | Wolinkski et al. |
| 4,354,894 A | | 10/1982 | Lewis et al. |
| 4,544,431 A | | 10/1985 | King |
| 4,707,211 A | | 11/1987 | Shibata |
| 4,749,432 A | | 6/1988 | Ando et al. |
| 4,784,714 A | | 11/1988 | Shibata |
| 4,808,639 A | * | 2/1989 | Chernack |
| 4,961,811 A | | 10/1990 | Haugwitz |
| 4,980,410 A | | 12/1990 | Fryd et al. |

(List continued on next page.)

FOREIGN PATENT DOCUMENTS

| | | | |
|---|---|---|---|
| EP | 0 171 919 | * | 2/1986 |
| EP | 0 547 379 | * | 6/1993 |
| JP | 6-314062 | * | 11/1994 |

OTHER PUBLICATIONS

"Capsules Capture New Markets," Chemical Week, Dec. 21, 1963.

Hartley, "Versatile Capsules: New Packaging Conept of Microencapsulation Wins Many Converts," The Wall Street Journal, Sep. 15, 1965.

Herbig, "Microencapsulation," Encyclopedia of Chemical Technology, vol. 13, Second Edition, 1967, pp. 436–456.

Huber et al., "Capsular Adhesives," Journal of the Technical Association of the Pulp and Paper Industry, vol. 49, No. 5, May 1966.

"NCR and Encapsulation," Applications Research Department, The National Cash Register Company, Dayton Ohio.

*Primary Examiner*—Melvin C. Mayes
(74) *Attorney, Agent, or Firm*—Birch, Stewart, Kolasch & Birch, LLP

(57) ABSTRACT

A system and method for rupturing an encapsulated adhesive in a sheet media uses an activator unit. This unit can include one or more of the following: a pressure roller, a pair of pressure rollers, an activator blade, a set of rotatable discs or a series of sets of rotatable discs. A sheet media having an encapsulated adhesive is fed past the activator unit in the system and method whereby the capsules will be ruptured. A feeder, label printer, cutter and label applicator can also be provided in this system.

44 Claims, 7 Drawing Sheets

U.S. PATENT DOCUMENTS

| | | | | | |
|---|---|---|---|---|---|
| 5,008,133 | A | * | 4/1991 | Herbet et al. | 427/356 X |
| 5,178,717 | A | | 1/1993 | Rodriguez | |
| 5,277,736 | A | | 1/1994 | Logan | |
| 5,443,680 | A | | 8/1995 | Gerber | |
| 5,518,576 | A | | 5/1996 | Mendelovich et al. | |
| 5,674,345 | A | | 10/1997 | Nash | |
| 5,688,363 | A | | 11/1997 | Hinton et al. | |
| 5,827,913 | A | * | 10/1998 | Baetzold et al. | |
| 5,895,552 | A | | 4/1999 | Matsuguchi | |
| 5,897,722 | A | | 4/1999 | Bright | |
| 5,942,330 | A | * | 8/1999 | Kelley | |
| 5,985,441 | A | | 11/1999 | Szczepaniec et al. | |
| 6,206,071 | B1 | | 3/2001 | Majkrzak et al. | |
| 2002/0148556 | A1 | * | 10/2002 | Kawada | 156/250 |

* cited by examiner

SYSTEM AND METHOD FOR RUPTURING ENCAPSULATED ADHESIVE IN SHEET MEDIA

BACKGROUND OF THE INVENTION

1. Field of the Invention

The present invention relates to a system and method for rupturing an encapsulated adhesive in a sheet media, such as an adhesive in a roll product. The system can further optionally include a printer for placing indicia on the sheet, a feeder for feeding the sheet, a cutter for cutting the roll product into discrete sheets and a label applicator for applying the discrete sheet to a desired product. This system can utilize a fixed, inclined activation blade which extends across the sheet media to rupture and/or spread the encapsulated media. Alternatively, a single crushing roller, a pair of crushing rollers or a series of crushing rollers can be used to rupture the encapsulated media. This roller or rollers can be used with or without the activation blade and can be eccentrically rotatable discs.

2. Description of the Background Art

Currently, it is known to place encapsulated adhesives on a sheet media. For example, a sheet of paper can have microdots or microlines with an adhesive as disclosed in U.S. Pat. No. 4,961,811. When it is desired to expose this adhesive, the encapsulated adhesive can be ruptured by applying pressure such as from a coin or fingernail. Other encapsulated adhesives are known which can be ruptured by exposure to heat.

However, there exists a need in the art for a system and method for rupturing an adhesive in a sheet media, which can work on a large scale. In other words, a system and method for mass producing a series of sheets which have their encapsulated adhesives ruptured are needed. Such a system and method can be used to supply ready to adhere labels for products. Other uses are also contemplated. Such a system and method should be reliable and of low costs and low need for maintenance.

SUMMARY OF THE INVENTION

Accordingly, it is an object of the invention to provide a system which can reliably rupture encapsulated adhesives contained in a sheet media.

A further object of the invention is to provide a method for reliably rupturing encapsulated adhesives contained in a sheet media.

It is a further object of the invention to provide such a system and method which can be used on a large scale to quickly provide application-ready labels and other adherable products.

Yet another object of this invention is to provide a low cost and low maintenance system and method.

These and other objects of the present invention are fulfilled by a system for rupturing an encapsulated adhesive contained in sheet media, comprising a feeder for the sheet media and an activation device for releasing the encapsulated adhesive as the sheet media is moved past the device by the feeder.

Additionally, these and other objects are fulfilled by a method for rupturing an encapsulated adhesive contained in sheet media, comprising the steps of providing a sheet media, feeding the sheet media along a travel path, passing the sheet media against an activation device, and rupturing the encapsulated adhesive as the sheet media moves past the activation device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
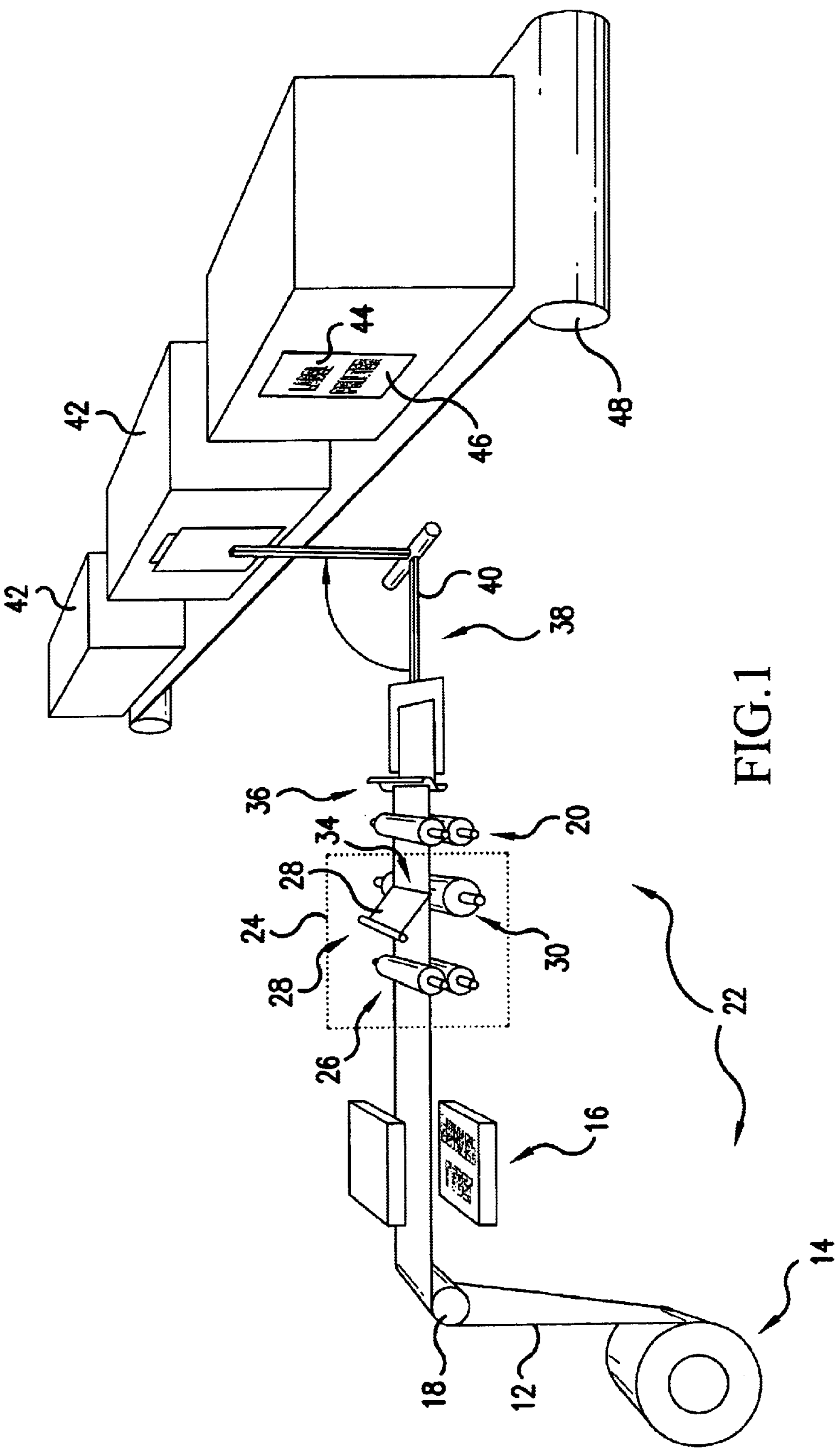
FIG. 1 is a schematic view of a first embodiment of the encapsulated adhesive rupturing system of the present invention.

Referring in detail to the drawings and with particular reference to FIG. 1, a first embodiment of a system 10 for rupturing an encapsulated adhesive contained in sheet media 12 is disclosed. While a web 14 of sheet media is disclosed, it should be understood that any form of media could be used. For example, a supply of individual sheets could instead be used. Moreover, many different types of sheet media can be used. For example, paper, metal foil, plastic sheets or any other desired sheet could be used.

Downstream from web 14, a label printer 16 is provided. This printer 16 will place indicia on the sheet media. Of course, this printer 16 could be omitted and the indicia preprinted on the sheet media if so desired. A roller 18 is shown between web 14 and printer 16. This roller diverts the direction of movement of the. sheet media. While not shown, some motor or other driver can be used for unwinding and/or moving the sheet media 12 through the system 10. The web 14 and driver rollers 20 are contemplated as being a part of the feeder 22 of the system 10. While a pair of drive rollers 20 on opposite sides of the sheet media have been shown, the form and positioning of this drive could of course be varied.

Upstream from drive rollers 22, an activation unit 24 is shown. In this embodiment, the activation unit 24 includes a pair of pressure or crushing rollers 26, an activator blade 28 and a support surface 30. The activation unit 24 is not limited to these elements, but in the first embodiment this unit will at least include the activator blade 28 and the crushing rollers 26.

By using both the pressure rollers 26 and activation blade 28, it can be ensured that the encapsulated adhesives contained in the sheet media 12 are ruptured. It is contemplated that the majority of rupturing of the encapsulated adhesives will be accomplished by the pressure rollers 26. However, in the first embodiment, some rupturing of the adhesives can also be carried out via the activator blade 28. Apart from rupturing any remaining unruptured encapsulated adhesives, this activator blade 28 serves to spread the adhesives around the sheet media 12. This will help adherence of the label or the product prepared from the sheet media, as will be discussed below.

It is also contemplated that, instead of using the pressure rollers 26 the activator blade 28 could instead be used alone. The force exerted by the activator blade would be greater than the force used when both pressure rollers 26 and an activator blade 28 are used. Nonetheless, it is contemplated that an activator blade alone could be used. However, it is important that the pressure exerted by this activator blade not be so great as to mar the sheet media. In addition, instead of a single blade 28, a series of blades could be used.

Figure 2:
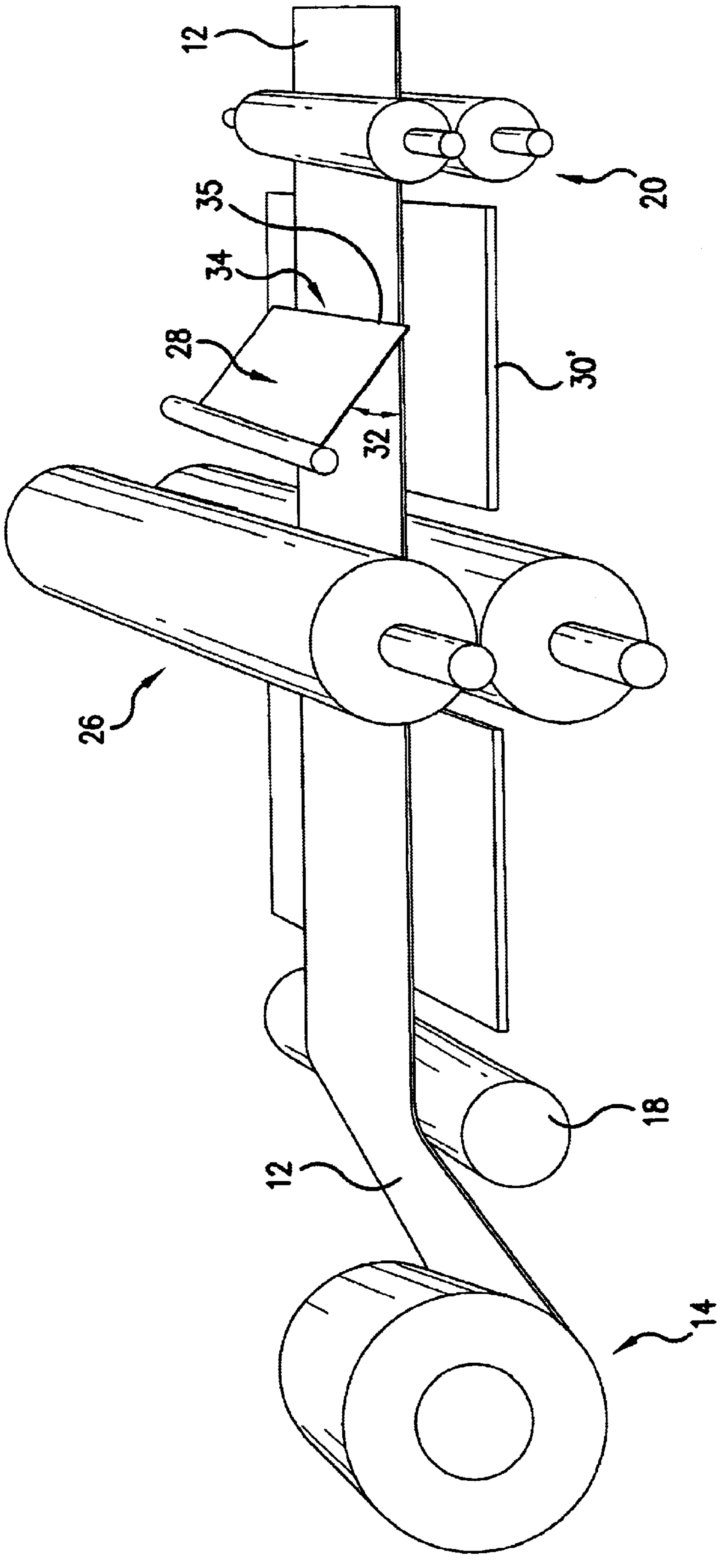
FIG. 2 is an enlarged view of FIG. 1 showing a detail of a portion of the system of the present invention.

As seen in the drawings, this blade 28 extends across the width of the sheet media and forms an acute angle 32 with an upstream position of the sheet media 12 as seen also in FIG. 2. It should be noted in FIG. 2 that the support surface 30' is a flat surface instead of the roller 30 shown in FIG. 1. Other surfaces could be used as desired. The sheet media 12 will move along a travel path 34 which is adjacent crushing rollers 26 and activator blade 28. As the sheet media passes through the activation unit 24, the microencapsulated adhesive in the sheet media 12 will be ruptured. Any type of suitable adhesive can be used in the sheet media.

The adhesives may be classified according to the mode of reactivation, by the extent of encapsulation, chemical composition, whether solvent-based, or reactive or curable. The entire adhesive can be encapsulated or a component could be encapsulated. Solvent-based systems are reactivated by applying pressure and releasing the capsule contents to tackify the adhesive. Adhesives such as polyvinyl acetate, rubber, nitrile rubber, ethylcellulose, or other cellulose derivatives such as cellulose acetate lend themselves to solvent reactivation. While the capsules are intact, the coating is dry to the touch. The coating is tackified upon rupture and release of the solvent. Such systems are taught for example in U.S. Pat. No. 2,907,682. Reactive resins can also be encapsulated. These could include materials such as epoxy, isocyanates, polyesters, polyacrylates, glycidyl acrylates, acrylic nitrile and methacrylates with curing agents such as azo initators, benzoyl peroxide, acid chorides or cross linking agents such as melamine formaldehyde and other materials.

The capsules can be assembled with the curing agents adhered to the outside of the capsule wall or adhered to the surface upon which the capsules are adhered. Examples of various adhesive systems include U.S. Pat. Nos. 3,996,308, 4,980,410, 4,808,639 and 3,725,501. More recently, encapsulated adhesives have been developed that form in situ in the microcapsules during the capsule formation process. These adhesives are based on acrylate or methacrylate type monomers. Such capsules for example are taught in U.S. Provisional Application No. 60/230,365 filed Sep. 6, 2000, the entire contents of which are hereby incorporated by reference. These adhesives are also dry to the touch. Upon capsule rupture, the tacky adhesive in the capsules is made available for bonding. The in situ microencapsulated adhesives, although preferred, should not be viewed as limiting of the device of the invention which can be utilized with the various microencapsulated adhesives.

The activator blade 28 is at a fixed position relative to travel path 34 as well as relative to a point on the support surfaces 30 and 30'. While roller 30 may be rotatable, the blade 28 is nonetheless at a fixed location relative to an axis of the roller. Of course, this roller 30 could also be non-rotatable if so desired.

The activator blade 28 is shown extending across all of the width of the sheet media 12 and is shown as having a linear edge 35. Of course, this blade could be only across half or a majority of the sheet. In fact, the blade 28 could only extend along a small width of the sheet media or could form some pattern across the width of the sheet media, for example, a comb-like, saw toothed pattern or curved pattern. Alternatively, the activator blade 28 could have staggered contact points with the sheet media. For example, if the blade 28 had a comb-like pattern, some teeth could be positioned further upstream or downstream relative to other teeth. Any number of patterns and placements could be had for the point or points of contact of the blade 28 with the sheet media 12. Nonetheless, this blade 28 should be at a fixed position to enable uniform, constant rupturing of the adhesive if it is used with crushing rollers 26.

If, however, a label is to be formed and adhesive is not needed at the periphery of the label, some reciprocating mechanism can be provided to repeatedly engage and disengage at least one of the rollers 26 and the blade 28 with the sheet 12 to form the desired pattern of ruptured encapsulated adhesive. It should therefore be appreciated that a great variety of designs or patterns can be formed with the ruptured adhesives, but the system 10 nonetheless enables mass production of ruptured adhesives on sheet material.

The crushing rollers 26 and activator blade 28 each exert a uniform pressure on the sheet media 12 in order to rupture encapsulated adhesive on the sheet media. The pressure applied is sufficient to break the capsules without damaging the sheet media. No wastes or adhesives build up at the activator blade 28 so that is does not need to act as a doctor blade. Continual long-term running of the system 10 is therefore possible. Not only will the blade 28 shear off the tops of unruptured adhesive capsules, but it will also spread or smear the adhesives on the sheet media 12.

Downstream from activation unit 24 and drive rollers 20, a cutter 36 is provided as shown in FIG. 1. This cutter 36 can be a reciprocable cutting blade or a roller with a cutting blade or any other suitable cutter. The cutter 36 can completely sever the sheet or can only partially cut or perforate the sheet as desired. In the embodiment shown, the cutter 36 is provided on both sides of the sheet media, but it could include a blade or knife only on one side of the sheet if so desired. If sheets are being fed through the system rather than a web of material, this cutter 36 can be omitted or simply shut off.

A label applicator 38 is then provided downstream from the cutter 36. This applicator includes a pivoting arm 40 for applying labels to a side of boxes 42. These labels include the severed sheet media with indicia 44 on one side and adhesive on the other side. The adhesive adheres the label 46 to the box 42.

The boxes 42 are fed along conveyor 48. A suitable control means (not shown) is provided for timing and controlling the overall operation of the system 10.

Figure 3:
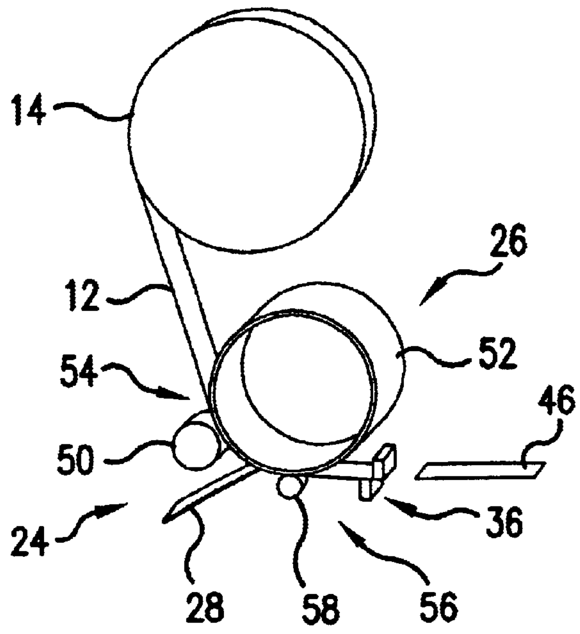
FIG. 3 is a schematic view of a second embodiment of the system of the present invention.

Turning now to FIG. 3, a third embodiment of the system of the present invention is shown. In this embodiment, a web 14 of sheet material 12 is provided. As with the first embodiment, a motor or other suitable drive can be utilized to unwind the sheet material 12 from the web. The activation unit 24 includes a pair of crushing rollers 26. Unlike the first embodiment, the crushing rollers shown in this second embodiment are a different size. In particular there is a smaller first crushing roller 50 and a larger second crushing roller 52. Between these crushing rollers, a crushing nip 54 is formed. While the larger second roller 52 is shown as being hollow, this is merely a schematic showing. This roller 52 can be hollow or can be solid as desired. Moreover, the exact sizes of the rollers 26 can be varied as desired. Nonetheless, these rollers 52, 54 will place a suitable pressure on the sheet media 12 in order to rupture the encapsulated adhesive. Then the activator blade 28 can smear or spread the adhesives. If so desired, a sufficient pressure can be provided by this activator blade 28 such that the encapsulated adhesives which are not ruptured by the crushing rollers 26 will be ruptured by blade 28. The activator blade 28 can sever the encapsulated adhesives or can provide sufficient force to crush the non-ruptured adhesives.

Downstream from the activator blade 28 is a drive nip 56. A roller 58 and the second crushing roller 52 will form this drive nip. The second crushing roller 52 and/or the roller 58 can be powered in order to feed the sheet media 12 through the system. A drive for unwinding web 14 can be omitted if so desired. Other drives, apart from nip 56, can be utilized if so desired. Since the adhesive will be activated downstream from the activator blade 28, the roller 58 can be coated in order to avoid adhesives adhering thereto.

Downstream from the drive nip 56 is a cutter 36. The comments made with regard to the cutter 36 in the first embodiment are equally applicable to the cutter used in this and subsequent embodiments. The cutter 36 will sever the sheet media 12 in order to form individual sheets. The web 14 of sheet media can have preprinted labels. Therefore, upon severing by the cutter 36, a label 46 will be formed by the individual sheets. While not shown, this second embodiment as well as other embodiments can have a label applicator 38. This applicator 38 can include a pivoting arm 40 for adhering the labels to boxes or other items. Conveyors, skids or other suitable devices for infeeding or outfeeding the items for labeling can also be utilized.

Figure 4:
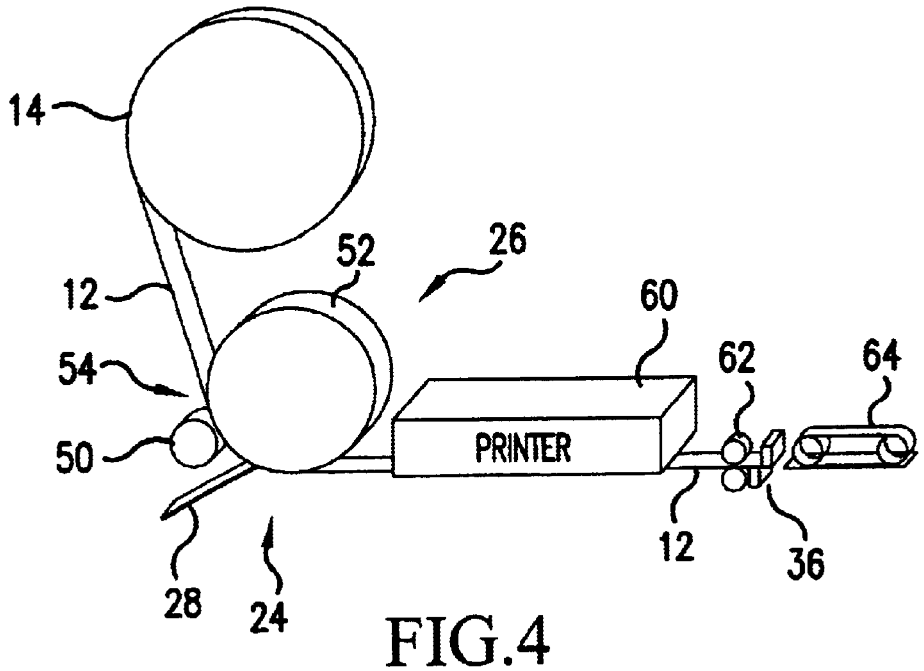
FIG. 4 is a schematic view of a third embodiment of the system of the present invention.

Turning now to FIG. 4, a third embodiment of the system of the present invention is shown. Similarly to the previously described embodiments, a web 14 of sheet material 12 is provided. Unlike the arrangement in FIG. 3, it is contemplated that the sheet media 12 in web 14 will not be preprinted. Therefore, a downstream printer 60 is utilized. This positioning of the printer in FIG. 4 differs from the printer 16 of FIG. 1. It should be appreciated that the printer 16 and/or 60 could be upstream and/or downstream from the activation unit 24 as desired.

While a roller 58 is not shown in FIG. 4 adjacent the second crushing roller 52, such a roller could be utilized if so desired. Any suitable drive for feeding the sheet media 12 through the system can be utilized.

Downstream from the printer 60 are a pair of guide rollers 52. These rollers 62 guide the sheet media to the cutter 36. From the cutter 36, a discharger 64 is shown. This discharger 64 can include a powered conveyor belt which will feed the severed labels from the cutter to the downstream location. As has been noted above, a label applicator and/or other suitable handling device can be provided.

Figure 5:
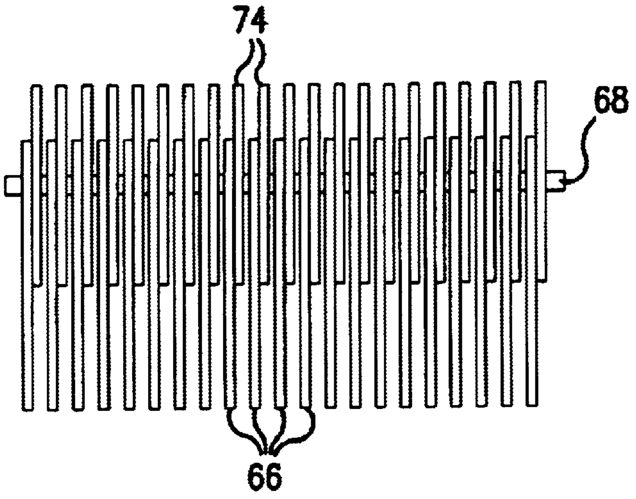
FIG. 5 is a side view of a set of crushing rollers used in a fourth embodiment of the present invention.
Figure 7:
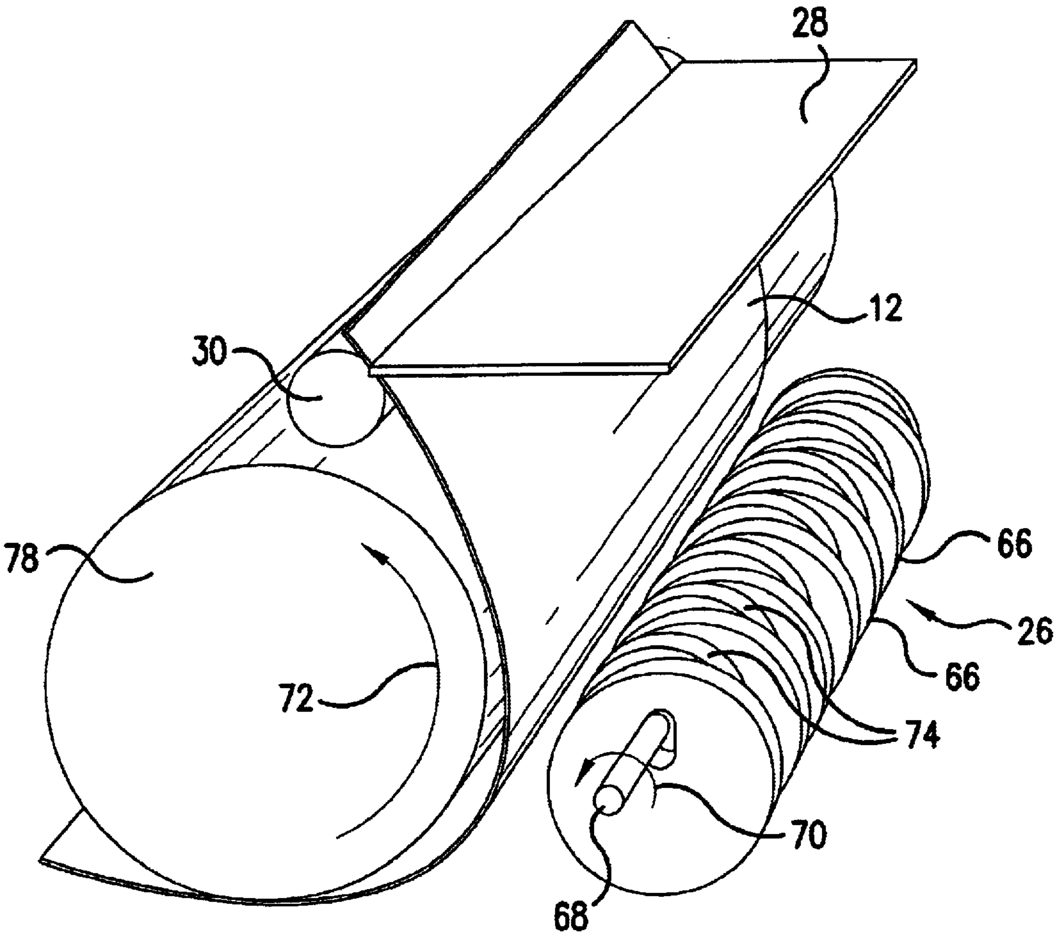
FIG. 7 is a view similar to FIG. 6, but showing the crushing rollers in a rest position.
Figure 6:
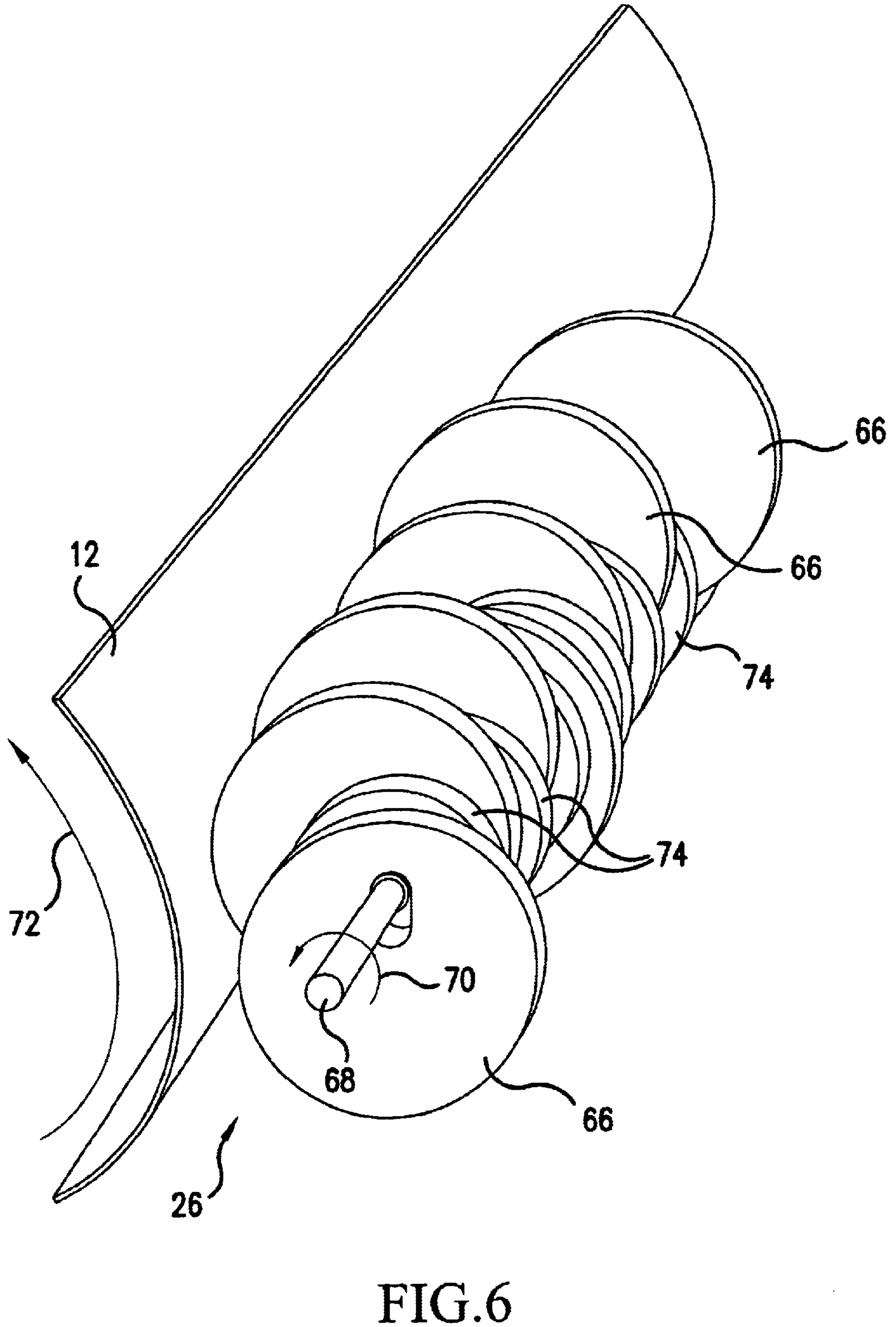
FIG. 6 is a perspective view of the set of crushing rollers of the fourth embodiment as shown in FIG. 5.

Turning now to the fourth embodiment shown in FIGS. 5-7, a plurality of discs 66 are utilized. These discs 66 are rotatable on axle 68 in a counterclockwise direction as indicated by the arrow 70 shown in FIG. 6. While a counterclockwise rotation is indicated, a clockwise rotation could also be utilized. A suitable motor is provided for driving the axle 68. As the axle 68 rotates, frictional engagement will cause the disc 66 to rotate. As seen in FIG. 6, these discs are eccentrically mounted such that they rotate in a non-uniform manner about the axle 68. This provides for different contact positions of the discs 66 along a width and length of the sheet media 12. The sheet media is fed in the direction indicated by arrow 72. Of course, the sheet media 12 could be fed in the opposite direction. While not shown, a backing roller, backing surface or other suitable device can be provided such that the sheet media 12 moves between this surface and the rotating discs 66.

Upon contact with the sheet media 12, the discs 66 will rupture the encapsulated adhesive. In this manner, a dispersed arrangement of released adhesives are provided on the sheet media 12.

Between the various discs 66, spacers 74 are provided. Any suitably sized spacers and discs can be used. It is contemplated that the spacers 74 will not be eccentrically mounted on the axle 68. However, such eccentric mounting could also be carried out. The discs 66 will frictionally engage the rotating axle 68 in order to undergo rotation. Upon stopping of rotation of the axle 68, the discs 66 will fall by gravity to a rest position. This position is shown in both FIGS. 5 and 7. In this rest position 76, the discs 66 are out of contact with the sheet media 12. Therefore, when the system of the present invention is shut off, the discs will move out of contact with the sheet media. Therefore, the ruptured adhesive will not have a chance to set up and adhere to the discs if the system is shut down for a long time.

While frictional engagement between the discs 66 and the axle 68 is contemplated, any other suitable arrangement can be had. For example, gearing or other known connectors may be provided. Moreover, the discs 66 may be permanently affixed to the axle 68 and a driver or other means can be provided in order to move the axle and its discs 66 away from the sheet media when the system is turned off. Nonetheless, a less complicated arrangement is provided by the design shown in FIG. 6. As noted above, when the system is shut down, the discs 66 will simply fall by gravity into their rest position 76. In this rest position 76, the discs 66 as well as the spacers 74 are spaced from and out of contact with the sheet media 12.

Figure 8:
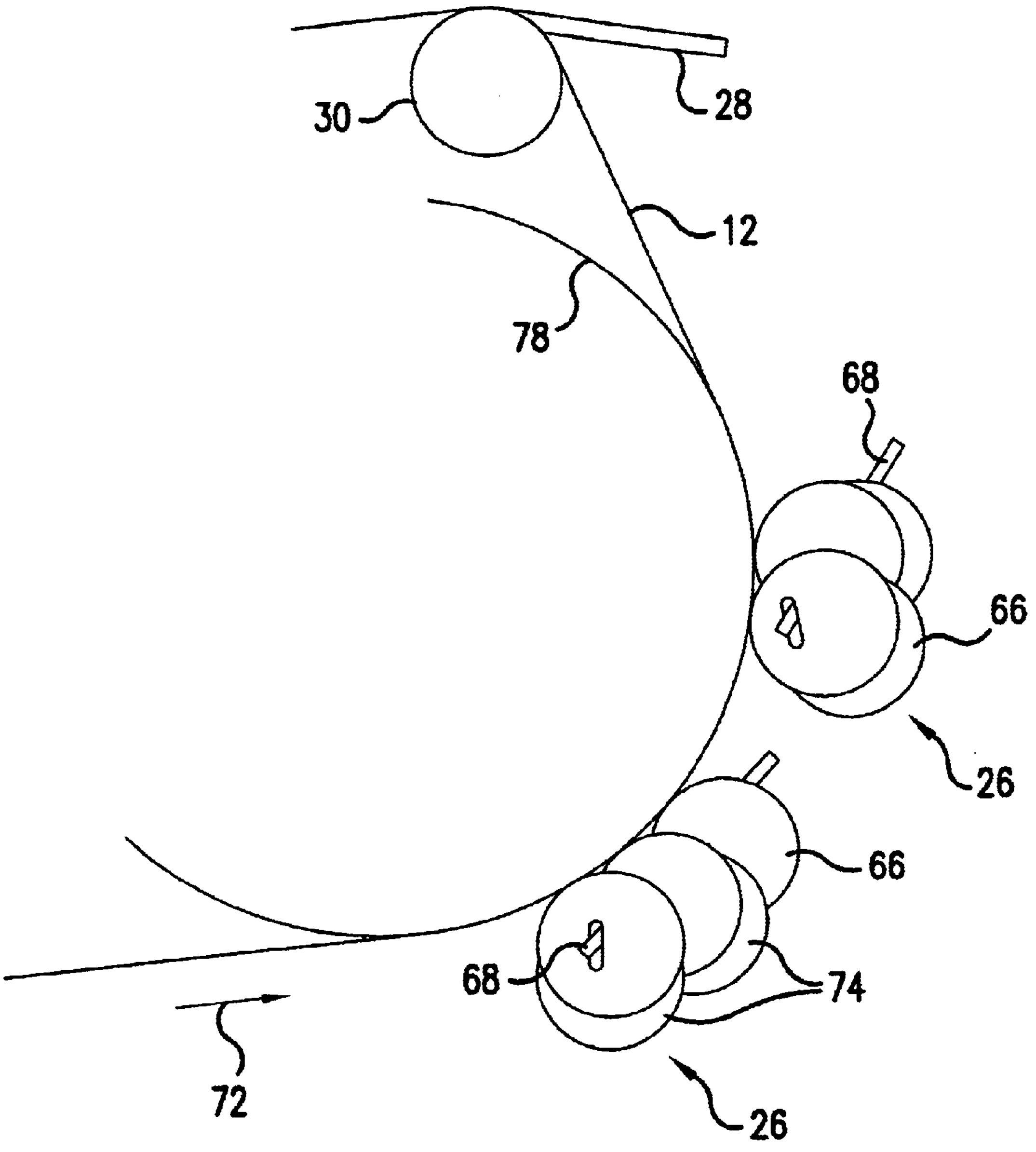
FIG. 8 is a schematic view showing a series of sets of crushing rollers used in a fifth embodiment of the present invention.

Turning now to FIG. 8, a system similar to that shown in FIGS. 5-7 is also shown. In this system, two sets of crushing rollers 26 are provided. In particular, an axle 68 with the plurality of discs 66 and spacers 74 are provided in each set of crushing rollers 26. Similarly to the embodiment of FIG. 6, these discs 66 are eccentrically mounted and upon rotation of the different axles 68, the discs will spin in order to engage the sheet media. This engagement will rupture the encapsulated adhesives. The two sets of crushing rollers 26 are spaced and timed such that a greater amount of encapsulated adhesives are ruptured than is done in the embodiment of FIGS. 5-7. In fact, more than two sets of crushing rollers 26 can be provided. The set of crushing rollers 26 can be timed and spaced such that the complete width or a majority of the width of the sheet media 12 have the encapsulated adhesives ruptured. Skewing the axle 68 relative to the travel path of the sheet media 12 will also help eliminate inactivated sections/lines of adhesive (and can eliminate the need for a second set of activator discs as will be discussed. below). This skewing would affect the motion of the disc 66 and would require a "flatter" backing surface or longer radius roller.

In FIG. 8, an activator blade 28 is shown downstream from the crushing rollers 26. While such an activator blade is not shown in the early embodiments of FIGS. 5-7, it is contemplated that it can be included if so desired. A separate support surface 30 is utilized in FIG. 8. If so desired, the activator blade 28 can engage the sheet media 12 as the sheet media is on the support 78. This support 78 supports the sheet media 12 as it moves past the sets of crushing rollers 26. It is contemplated that, upon termination of rotation of the axles 68, the discs 66 will fall to the rest position 76 by gravity.

Figure 9:
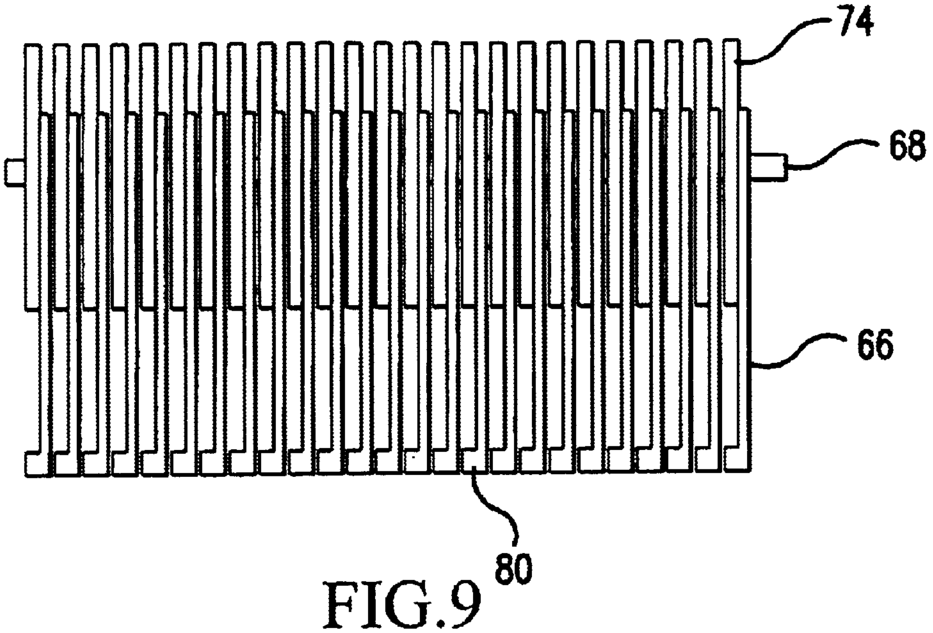
FIG. 9 is a side view of a set of crushing rollers of a second embodiment of a disc having a widened edge.
Figure 10:
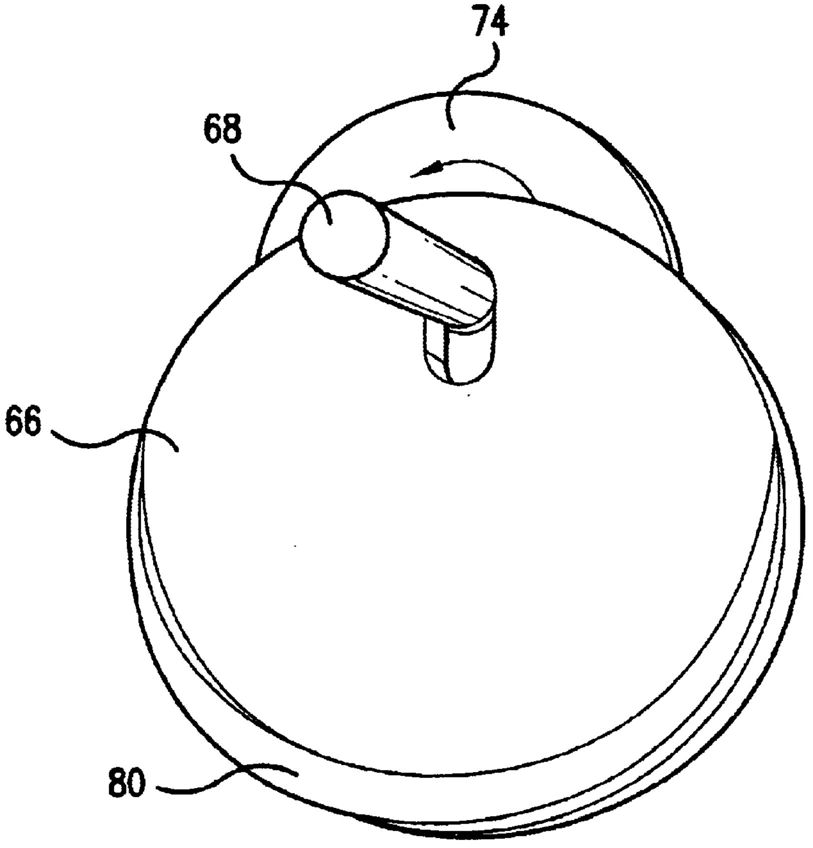
FIG. 10 is an end view of the second embodiment of the widened disc used in the crushing roller of the present invention.

Turning now to FIGS. 9 and 10, a modified form of the discs 66 is shown. In particular, these discs 66 have widened edges 80. These widened edges 80 are designed to reduce the distance between the discs 66 as can be seen in FIG. 9. In FIG. 10, the discs 66 have a widened edge 80 formed by a step. While the step does not completely encircle disc 66, it could if so desired. Moreover, this edge or a portion of it could be flared. However, such a flared edge would be harder to machine. The discs in FIGS. 9 and 10 are in the rest position but would be rotated about an eccentric path similarly to the earlier described discs. The spacers 74 in the prior described embodiments will cause some spaces between the contact area of the disc 66 with the sheet media 12. In these spaces on the sheet media 12, the adhesives will not be activated. These widened or flared edges will increase the contact area of the disc 66 with the sheet media 12 and therefore increase the amount of ruptured encapsulated adhesives. If so desired, the spacers 74 can be omitted or of such a small size that the discs 66 will substantially work across the entire width or a majority of the width of the sheet media 12. As seen in FIG. 9, however, even when using spacers 74, the edges of the widened disc 66 almost touch so that a relatively large area of the width of the sheet media 12 will be engaged.

With any of the different described systems of the present invention, a method for rupturing an encapsulated adhesive contained in sheet media is provided. In this method, the sheet media 12 is provided. The sheet media 12 is then fed along the travel path 34. The sheet media will pass an activation device. This activation device includes the activation unit 24. In the activation unit 24, a pair of crushing rollers or a single crushing roller can be provided. An activator blade 28 can be provided to also rupture encapsulated adhesives or to just simply smear the already ruptured adhesives on the sheet media. Alternatively, it is also possible to simply use the activator blade 28 alone as the unit for rupturing the encapsulated adhesives. As described above with reference to the embodiments beginning with FIG. 5, a series of rotatable discs 66 an also be used as the activation device. Either a single set of discs or a plurality of sets of discs can be utilized. With either of these arrangements, an activator blade 28 can be used or omitted as described above. After the sheet media is passed against the activation device 24, the encapsulated adhesives of the sheet media will be ruptured as has been described above.

The system and method of the present invention mass produces a series of labels or sheets, which have an adhesive ready for use. The activating unit 24 reliably and consistently provides for a useable adhesive by rupturing the microencapsulated adhesives provided in sheet media 12. This system is relatively low cost and easy to maintain.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for rupturing an encapsulated adhesive contained in sheet media, comprising the steps of:

providing a sheet media;

feeding the sheet media along a travel path;

passing the sheet media against an activation device;

rupturing the encapsulated adhesive as the sheet media moves past the activation device, wherein the activation device includes an activator blade; and spreading the adhesive after rupture thereof with the activator blade.

2. The method as recited in claim 1, wherein the activation device further comprises at least one crushing roller, the crushing roller being located upstream from the activator blade and wherein the method further comprises the step of sequentially engaging the sheet media with the at least one crushing roller and the activator blade.

3. The method as recited in claim 2, wherein the step of feeding the sheet media moves the sheet media at a first speed and the method further comprises the step of moving the at least one crushing roller at a second speed, the first speed being different from the second speed.

4. The method as recited in claim 3, further comprising the step of printing indicia on the sheet media.

5. The method as recited in claim 3, further comprising the step of using sheet media with indicia printed on at least one surface thereof.

6. The method as recited in claim 1, wherein the activation device includes at least one crushing roller, the method further comprises the step of rotating the at least one crushing roller about an axis.

7. The method as recited in claim 6, wherein the step of feeding the sheet media moves the sheet media at a first speed and the method further comprises the step of rotating the at least one crushing roller at a second speed, the first speed being different from the second speed.

8. The method as recited in claim 6, wherein the at least one crushing roller includes a plurality of rollers, the step of rotating includes eccentrically rotating the rollers about the axis.

9. The method as recited in claim 8, further comprising the step of moving the plurality of rollers by gravity to a rest position upon stopping of rotation about the axis, the rollers being out of contact with the sheet media when in the rest position.

10. The method as recited in claim 9, wherein the plurality of rollers are rotatable about an axle and wherein the method comprises the step of holding the axle stationary relative to the travel path during movement of the rollers to the rest position.

11. A system for rupturing an encapsulated adhesive contained in a dry sheet media, comprising:

the dry sheet media containing the encapsulated adhesive;

a feeder for the dry sheet media; and an activation device for releasing the encapsulated adhesive as the dry sheet media is moved past the device by the feeder, wherein the activation device is an activator blade past which the feeder moves the sheet media along a travel path, the activator blade being fixed in position relative to the path of the sheet media.

12. The system as recited in claim 11, further comprising a support surface adjacent the activator blade, the travel path passing between the activator blade and the support surface.

13. The system as recited in claim 11, wherein the support surface is a roller.

14. The system as recited in claim 11, wherein the activator blade extends across at least half of a widthwise direction of the sheet media.

15. The system as recited in claim 11, wherein the activator blade extends across a majority of a width of the sheet media.

16. The system as recited in claim 11, wherein an edge of the activator blade is generally flat and linear and wherein the edge of the activator blade engages at least half of a width of the sheet media.

17. The system as recited in claim 11, wherein the blade is at a fixed angle relative to the travel path.

18. The system as recited in claim 17, wherein the fixed angle is an acute angle between the activator blade and an upstream position of the sheet media.

19. The system as recited in claim 11, further comprising a printer, the printer being located downstream of the activator blade and being adjacent to the travel path.

20. The system as recited in claim 11, further comprising a printer, the printer being located upstream of the activator blade and being adjacent to the travel path.

21. The system as recited in claim 11, wherein the activator blade extends across at least half of a widthwise direction of the sheet media and wherein the activator blade is at a fixed angle relative to the travel path.

22. A system for rupturing an encapsulated adhesive contained in sheet media, comprising:

a feeder for the sheet media;

an activation device for releasing the encapsulated adhesive as the sheet media is moved past the device by the feeder, wherein the activation device is an activator blade past which the feeder moves the sheet media along a travel path, the activator blade being fixed in position relative to the path of the sheet media;

a cutter for cutting the sheet media; and a label applicator, the label applicator being downstream from the cutter.

23. The system as recited in claim 22, further comprising a pair of drive rollers between the activator blade and the cutter, the drive rollers being a part of the feeder.

24. The system as recited in claim 23, further comprising a roll supply for feeding a web of the sheet media, the roll supply being a part of the feeder.

25. The system as recited in claim 23, wherein the activator blade extends across at least half of a widthwise direction of the sheet media.

26. The system as recited in claim 22, further comprising a printer for placing indicia on the sheet material, the activator blade being located between the printer and the cutter.

27. A system for rupturing an encapsulated adhesive contained in a dry sheet media, comprising:

means for feeding the dry sheet media containing the encapsulated adhesive; and means for activating and for releasing the encapsulated adhesive as the sheet media is moved past the device by said feeding means, wherein said activating means is an activator blade past which said feeding means moves the sheet media along a travel path, the activator blade being fixed in position relative to the path of the sheet media, wherein said activating means further includes at least one crushing roller for rupturing and thereby releasing the encapsulated media.

28. The system as recited in claim 27, wherein the at least one crushing roller includes a pair of crushing rollers, said feeding means moves the sheet media along a travel path and the pair of crushing rollers being located on opposed sides of the travel path, a crushing nip being formed between the pair of crushing rollers.

29. The system as recited in claim 27, further comprising a printer, the printer being located upstream of the at least one crushing roller.

30. The system as recited in claim 27, further comprising a printer, the printer being located downstream of the at least one crushing roller.

31. The system as recited in claim 27, further comprising:

a cutter for cutting the sheet media; and a label applicator, the label applicator being downstream from the cutter.

32. The system as recited in claim 27, wherein the at least one crushing roller is a single roller which engages the sheet media as the sheet media is moved along the travel path.

33. A system for rupturing an encapsulated adhesive contained in a dry sheet media, comprising:

the dry sheet media containing the encapsulated adhesive;

a feeder for the dry sheet media;

an activation device for releasing the encapsulated adhesive as the sheet media is moved past the device by the feeder, wherein the activation device is an activator blade past which the feeder moves the sheet media along a travel path, the activator blade being fixed in position relative to the path of the sheet media; wherein the feeder moves the sheet media along a travel path, and the activation device further includes at least one crushing roller being located on one side of the travel path and the activator blade being located on an opposed side of the travel path.

34. The system as recited in claim 33, wherein at least one crushing roller includes a pair of crushing rollers on opposed sides of the travel path, a crushing nip being formed between the pair of crushing rollers.

35. The system as recited in claim 34, further comprising a printer, the printer being located downstream of the crushing nip.

36. A system for rupturing an encapsulated adhesive contained in sheet media, comprising:

a feeder for the sheet media; and an activation device for releasing the encapsulated adhesive as the sheet media is moved past the device by the feeder, wherein the activation device is an activator blade past which the feeder moves the sheet media along a travel path, the activator blade being fixed in position relative to the path of the sheet media, wherein the activation device includes at least one crushing roller for rupturing and thereby releasing the encapsulated media wherein the at least one crushing roller includes a plurality of rollers positioned on a rotatable axle, the rollers being engageable with the sheet media when the axle is rotated.

37. The system as recited in claim 36, wherein the plurality of rollers are movable relative to the axle and wherein the rollers non-simultaneously contact the sheet media whereby different portions of the sheet media in a widthwise direction thereof are engaged by the rollers.

38. The system as recited in claim 37, wherein the plurality of rollers move to a rest position when rotation of the axle stops, gravity moving the rollers to the rest position upon stopping of the axle.

39. The system as recited in claim 38, wherein feeder moves the sheet media along a travel path and wherein the axle is stationary relative to the travel path when the rollers move to the rest position.

40. The system as recited in claim 36, wherein at least two sets of crushing rollers are provided, one of the sets being located downstream from the other set.

41. The system as recited in claim 40, wherein each of the at least two sets have a plurality of crushing rollers and an axle, the crushing rollers being rotatable about and movable relative to the axle for the set.

42. The system as recited in claim 36, further comprising a plurality of spacers, the spacers being located between the rollers.

43. The system as recited in claim 42, wherein at least some of the rollers have flared edges which overlie an adjacent spacer.

44. A system for rupturing an encapsulated adhesive contained in a dry sheet media, comprising:

the dry sheet media containing the encapsulated adhesive;

a feeder for the dry sheet media; and an activation device for releasing the encapsulated adhesive as the dry sheet media is moved past the device by the feeder, wherein the encapsulated adhesive is an in situ microencapsulated adhesive and the activation device includes at least one activator blade.

* * * * *